United States Patent [19]

Goans

[11] 4,436,105
[45] Mar. 13, 1984

[54] VALVE ACTUATOR HAVING AN ADJUSTABLE COLLET LOCK

[75] Inventor: Kip B. Goans, Harvey, La.

[73] Assignee: Baker CAC, Inc., Belle Chasse, La.

[21] Appl. No.: 318,188

[22] Filed: Nov. 4, 1981

[51] Int. Cl.³ .......................................... F16K 31/122
[52] U.S. Cl. ......................................... 137/1; 251/58; 251/163; 92/13.6; 92/25
[58] Field of Search ................. 251/58, 163, 188, 158, 251/307, 56; 192/111 A; 188/196 B; 92/13.6, 13.8, 25, 26

[56] References Cited

U.S. PATENT DOCUMENTS

| | | | |
|---|---|---|---|
| 3,207,468 | 9/1965 | Lauducci et al. | 251/58 |
| 3,430,745 | 3/1969 | Randol | 188/196 B |
| 3,882,935 | 5/1975 | Calhoun | 251/58 |
| 4,044,835 | 8/1977 | Mott | 251/58 |
| 4,058,165 | 11/1977 | Holden et al. | 251/58 |
| 4,304,322 | 12/1981 | Beccaris | 188/196 B |

*Primary Examiner*—Martin P. Schwadron
*Assistant Examiner*—James R. Shay
*Attorney, Agent, or Firm*—Norvell & Associates

[57] ABSTRACT

A fluid pressure valve actuator of the type utilized for controlling the operation of a ball-type valve is provided and includes a housing for supporting an actuating shaft for axial movement relative to the housing. A piston assembly is mounted within the housing and is responsive to fluid pressure for moving the shaft axially to an actuated position. A latch member is provided in the actuator for engagement with a shoulder portion on the actuating shaft to define an actuated position. In accordance with the present invention, the latch member is mounted for selective axial movement relative to the housing. This permits the axial position of the latch member to adjust the change in the actuating position of the shaft thereby compensating for wear in the internal components of the valve. In the preferred embodiment of the invention, a ratcheting element such as an adjustable collet lock is utilized as the means for supporting the latch member. The ratcheting element is responsive to axial movement of the piston assembly for selectively moving the latch member axially in one direction when an adjustment is required, but preventing axial movement of the latch member in the opposite direction.

22 Claims, 6 Drawing Figures

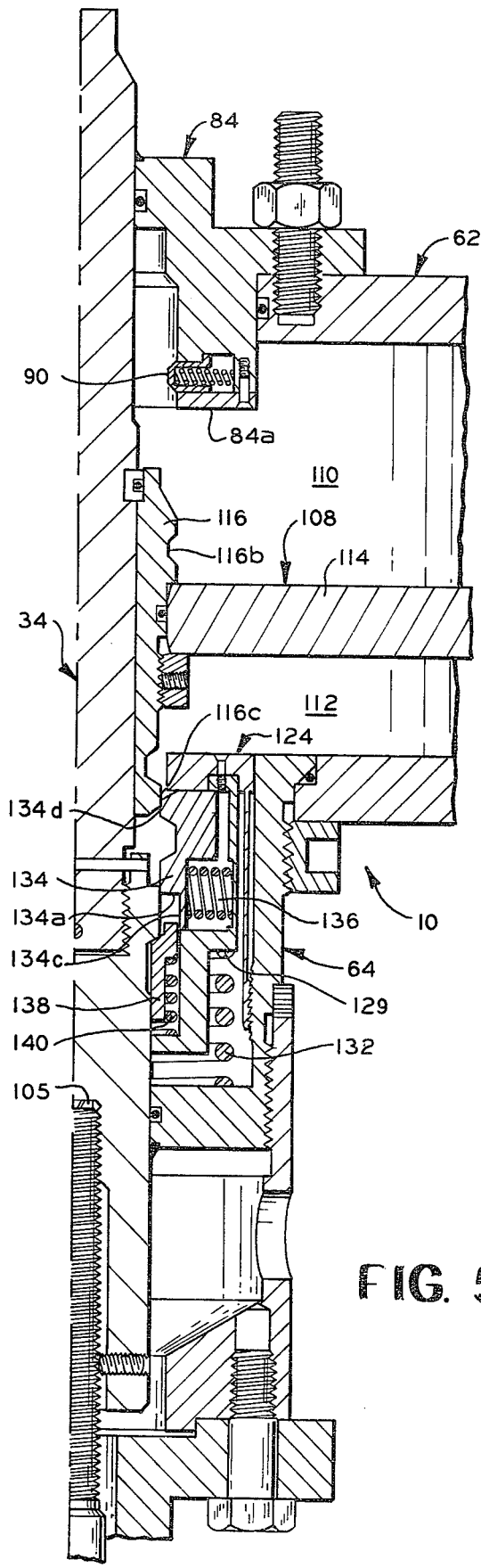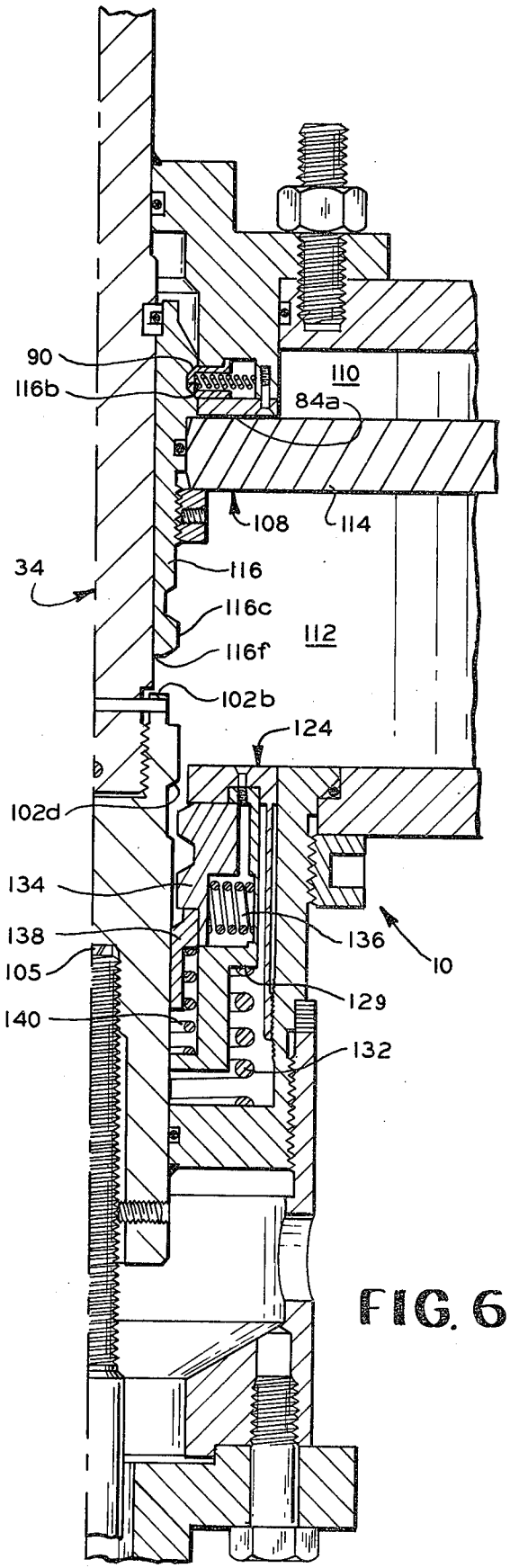

VALVE ACTUATOR HAVING AN ADJUSTABLE COLLET LOCK

BACKGROUND OF THE INVENTION

1. Field of the Invention.

The present invention relates in general to actuating devices and in particular to valve actuators for ball-type valves.

2. Description of the Prior Art

Ball-type valves such as valves manufactured by Orbit Valve Company of Little Rock, Ark., include a main body having a trunion-mounted ball centrally located therein for controlling fluid flow through a central passageway. In its closed position, an annular sealing surface formed on the ball is urged into sealing engagement with a sealing ring mounted in the main body. In order to move the valve to an open position, the ball is rotated 90° such that a passageway formed through the ball is aligned with the passageway of the main body.

A valve stem having one end coupled to the ball is mounted within a bonnet of the valve and is utilized for controlling the operation of the valve. The stem is cammed such that axial movement of the stem produces concurrent rotational movement of the stem. Upward movement of the stem in conjunction with the concurrent rotational movement of the stem functions to pivot the sealing surface of the ball away from the sealing ring and rotate the ball 90° in one direction to open the valve, while downward movement of the stem rotates the ball 90° back to its closed position as a ramp surface formed on the lower end of the valve stem wedges the sealing surface of the ball tightly against the sealing ring.

While the above described type of ball valve has proved to be satisfactory, a problem may arise after the ball valve has been subjected to a period of use. This problem is caused by wear of the ramp surface provided on the one end of the stem which is utilized to wedge the annular sealing surface of the ball tightly against the sealing ring. After some time, this surface becomes worn such that, if the downward stop position of the stem is not properly adjusted, a tight seal will not be produced. Additionally, repeated usage compresses and wears the seat requiring further downward axial movement of the shaft.

A problem arises when a latching-type actuator heretofore known, is used on such a valve. The valve design necessitates that the actuator down-stop be the seating on the ball member itself. However, the aforementioned latching actuator requires that the down-stop be built into the valve, to permit the latched position to have little free play. Such free play could cause the valve to unseat. In these instances, the actuating device must typically be manually adjusted to position the downward stop of the valve stem such that a satisfactory seal will be provided. If the ball valve is located in a subterranean chamber, this adjustment is not practical. Additionally, use of such an actuator requires that this adjustment be routinely checked.

SUMMARY OF THE INVENTION

The present invention relates to an automatic valve actuator for the above described ball-type valves which includes means for automatically adjusting the latched position of the valve stem in order to compensate for a change in the valve down-stop due to wear in the internal components of the valve.

The valve actuator assembly includes a housing. An actuating shaft is supported for limited axial movement relative to the housing and has one end coupled to the valve stem for controlling actuation of the valve. A piston assembly is mounted within the housing and is adapted for moving the actuating shaft in one direction to an actuated position for closing the valve and for moving the actuating shaft in an opposite direction to a deactuated position to open the valve.

In accordance with the present invention, the valve actuator is provided with an adjustable latching assembly for maintaining the valve in its closed position. The latching assembly includes a latch member for engaging a shoulder portion formed on the actuating shaft to define the actuated position of the shaft. The latching assembly automatically adjusts the position of the latch member in order to compensate for wear of the ramp surface on the valve stem and the valve seat.

This adjustment feature is accomplished by coupling the latching assembly to the housing by means of a ratcheting element mounted for selective axial movement relative to the housing. The ratcheting element includes a plurality of circumferentially spaced, radially movable arms each having a series of parallel external annular ribs formed thereon which cooperate with parallel internal annular ribs formed in the housing. The ribs are formed with a cross-section similar to that of buttress-type threads for permitting selective axial movement of the latching assembly in one direction, while preventing axial movement of the latching assembly in an opposite direction. As the ramp surface of the valve stem wears, the latching assembly is selectively ratcheted downwardly in response to the successive axial movements of the piston assembly.

BRIEF DESCRIPTION OF THE DRAWINGS

FIG. 5 is a sectional view, similar to FIG. 3, but showing the positions of the piston assembly and the actuating shaft as the piston assembly begins to move upwardly.

FIG. 6 is a sectional view, similar to FIG. 5, but showing the piston assembly and the actuating shaft in the upward actuated position.

DESCRIPTION OF THE PREFERRED EMBODIMENTS

Figure 1:
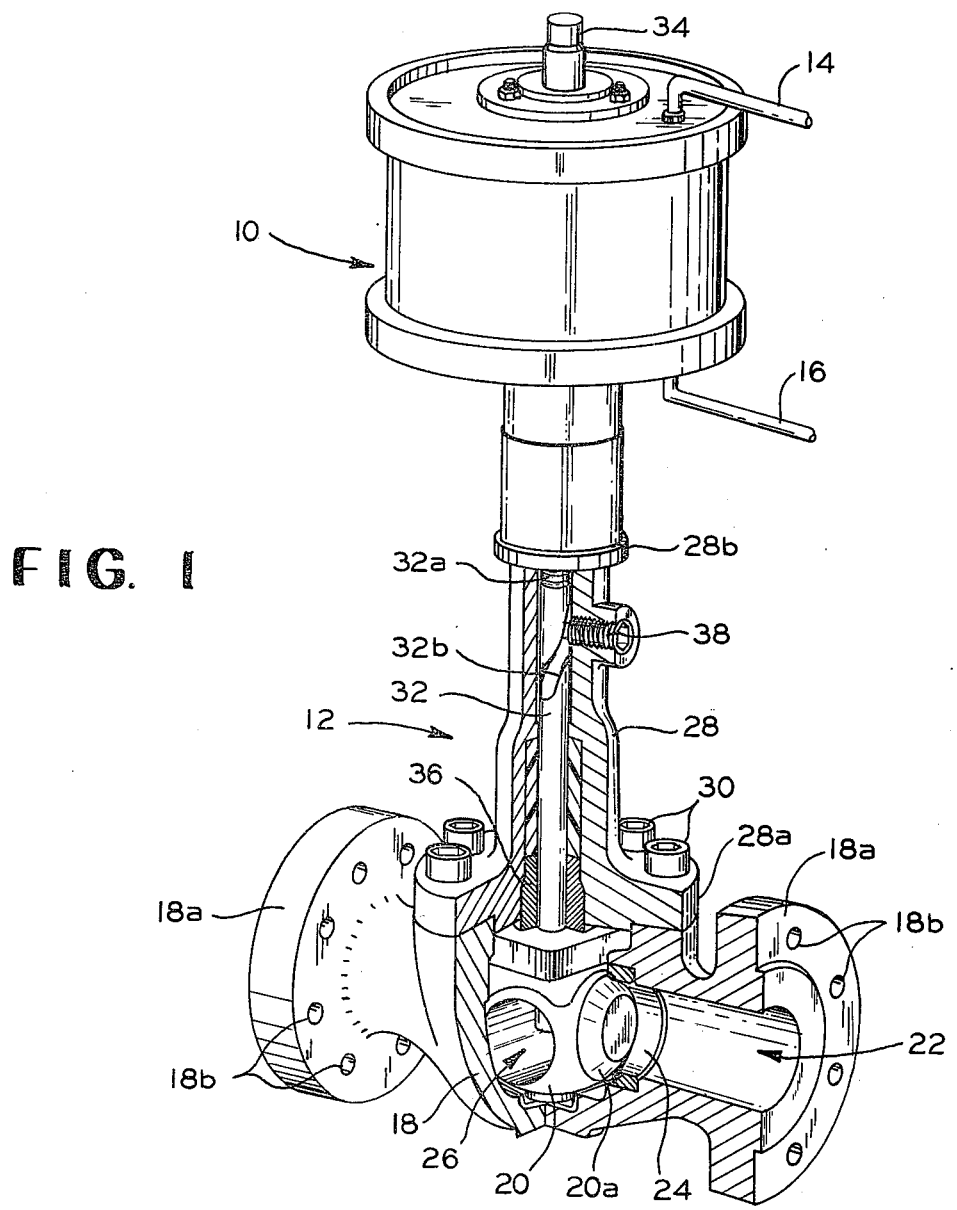
FIG. 1 is a perspective view, with portions broken away, illustrating a fluid pressure valve actuator according to the principles of the invention positioned on top of an associated prior art ball-type valve assembly.

Referring to FIG. 1, there is shown a fluid valve actuator 10 according to the present invention which is positioned on top of a ball-type valve 12. The valve actuator 10 receives fluidic control signals from lines 14 and 16 for controlling the actuation of the valve 12.

Figure 2:
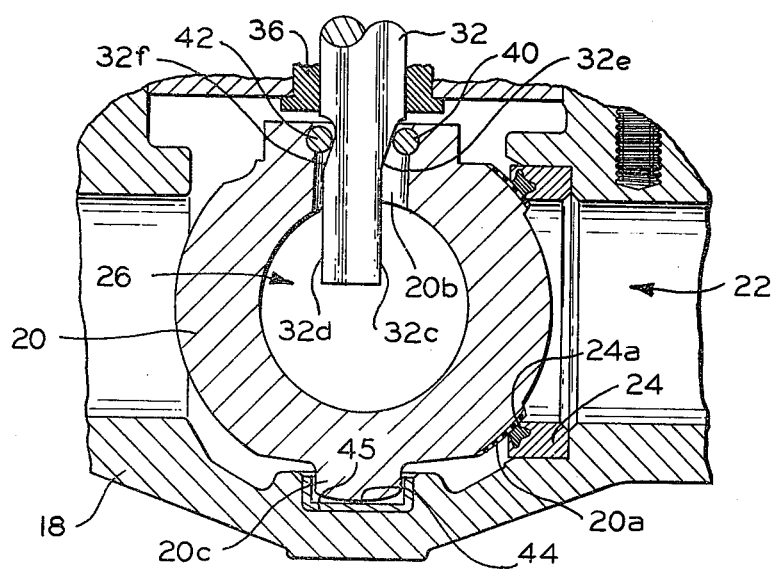
FIG. 2 is an enlarged fragmentary sectional view illustrating the manner in which the ball is mounted in the prior art valve assembly of FIG. 1.

The ball valve 12 may be of the type manufactured by Orbit Valve Company of Little Rock, Ark. The valve 12 includes a main body 18 having a ball 20 centrally located therein for controlling fluid flow through a central passageway 22. In its closed position, as shown in FIGS. 1 and 2, an annular sealing surface 20a formed on the ball 20 is urged into sealing engagement with a sealing ring 24 mounted in the main body 18 in surrounding relation to passageway 22. In order to move the valve to an open position, the ball 20 is rotated 90°, such that a central passageway 26 formed through the ball 20 is aligned with the passageway 22. The main body 18 is provided with mounting flanges 18a at the ends thereof, each having a plurality of peripherally spaced holes 18b formed therein for attachment to a fluid conduit (not shown).

The valve 12 also includes a bonnet 28 having a lower flange portion 28a which is attached to the upper end of the main body 18 by a plurality of bolts 30. The bonnet 28 has an upper flange 28b which is utilized to securely mount the valve actuator 10 to the valve 12. A valve stem 32 extends longitudinally through the bonnet and has an upper threaded portion 32a which is attached to the lower end of an actuating shaft 34 of the actuator 10, and has lower end extending through a bushing 36 located in the lower end of the bonnet 28.

The valve stem 32 is mounted within the bonnet 28 for limited axial and rotational movement which is controlled by cam slot 32b formed in the stem 32 and a cooperating camming pin 38 threadably mounted in the sidewall of the bonnet 28 and extending radially into the cam slot 32b. As will be discussed, upward movement of the stem 32 in conjunction with the camming action between the slot 32b and the pin 38 causes the stem to rotate 90° in one direction to open the valve 12, while downward movement of the stem 32 rotates the stem 90° back to its closed position.

Referring to FIG. 2, there is shown a more detailed cross-sectional view illustrating the manner in which the ball 20 is mounted within the main body 18. When the ball 20 is in its closed position, as shown in FIG. 2, the annular sealing surface 20a of the ball 20 is maintained in sealing engagement with a cooperating annular sealing surface 24a formed on the sealing ring 24. The upper end of the ball 20 is provided with an aperture 20b having a pair of spaced apart parallel horizontal pins 40 and 42 mounted on the upper end thereof. The lower end of the stem 32 extends downwardly from the bushing 36 and through the aperture 20b. The lower end of the stem 32 has a pair of opposite parallel flat portions 32c and 32d which are spaced apart a distance substantially equal to the opening provided through the pins 40 and 42. The flat portions 32c and 32d extend upwardly to form a pair of parallel ramp surfaces 32e and 32f respectively. The lower end of the ball 20 has a trunion 20c which is received within a cup-shaped bearing 44 mounted within a recess 45 provided in the lower end of the main body 18.

As mentioned, in FIGS. 1 and 2 the valve 12 is shown with the ball 20 in its closed position. In this position, the stem 32 is located in its downward position such that the ramp surfaces 32e and 32f provided on the lower end of the stem 32 pivot the ball 20 about the trunion 20c to wedge the sealing surfaces 20a and 24a together and thereby provide a tight seal. When it is desired to move the ball 20 to the open position, the stem 32 is moved upwardly such that the ball 20 is first pivoted away from the seal ring 24 and, then the ball is rotated 90° such that the fluid passageway 26 through the ball is aligned with the fluid passageway 22 of the main body 18.

As previously mentioned, one of the problems associated with the above described actuated ball-type valve is that, after a period of use, the ramp surface 32e at the lower end of the stem 32 will become worn such that the sealing surface 20a of the ball 20 will not be tightly wedged against the sealing ring 24. Consequently, it is desirable to provide means for allowing the lowermost position of the stem 32 to compensate for any wear on the ramp surface 32e and the seals 24, yet keep the actuator latch position from having any free upward movement.

Figure 3:
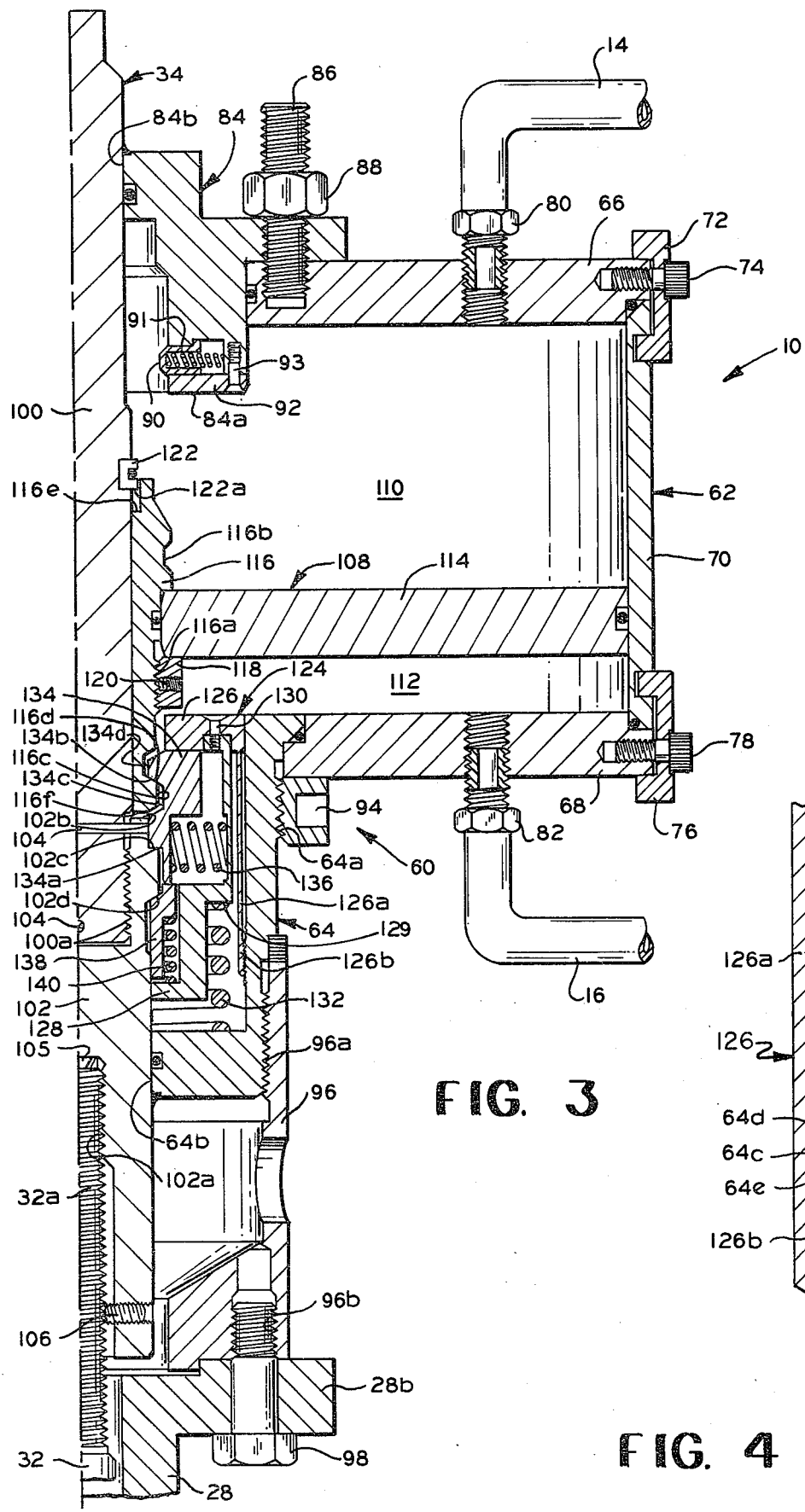
FIG. 3 is an enlarged quarter sectional view of the valve actuator of FIG. 1 with the actuating shaft in the downward actuated position.

Referring to FIG. 3, there is shown a quarter cross-sectional view of the fluid valve actuator 10 of FIG. 1 which, as will be discussed, includes means for automatically adjusting the lowermost latched position of the valve stem 32 in order to compensate for any wear present on the ramp surface 32e. The actuator 10 includes a main housing 60 consisting of an upper cylindrical body 62 and a lower latch housing portion 64. The actuating shaft 34 is mounted for rotational and limited axial movement within the main housing 60.

The cylindrical body 62 of the main housing 60 includes an upper plate 66 and a lower plate 68 which are maintained in a parallel spaced relationship by means of an outer cylindrical wall 70. An upper clamping ring 72 is utilized in conjunction with a plurality of circumferentially spaced bolts 74 for clamping the cylindrical wall 70 to the upper plate 66. Similarly, a lower clamping ring 76 is utilized in conjunction with a plurality of circumferentially spaced bolts 78 for clamping the lower end of the cylindrical wall 70 to the lower plate 68. Both the upper and lower plates 66 and 68 have threaded apertures formed therein for receiving threaded fittings 80 and 82 for connection to the fluid control lines 14 and 16 repectively.

An axially adjustable head 84 having a lower surface 84a is mounted to the upper plate 66 by means of a plurality of circumferentially spaced threaded shafts 86 and associated locking nuts 88. The head 84 includes an inner annular bearing surface 84b for slidably and sealingly engaging the upper end of the shaft 34. The head 84 also includes a plurality of hollow latching pins 90 which are biased radially inwardly by means of a compression spring 91. The latching pins 90 are secured to the head 84 by means of a plate 92 and a plurality of threaded fasteners 93. As will be discussed, the latching pins 90 are utilized to maintain the actuating shaft 34 in its uppermost position.

The lower plate 68 is secured to the lower latch housing 64 by means of an internally threaded locking ring 94 which engages a cooperating externally threaded portion 64a formed on the outer wall of the housing 64. The threaded engagement between the locking ring 94 and the housing 64 is tightened to securely clamp the overlapping portions of the housing 64 and the lower plate 68. The housing 64 includes an inner annular bearing surface 64b at its lower end for slidably and sealingly engaging the lower end of the actuating shaft.

The lowermost end of the latch housing 64 is connected to an adapter element 96 by means of a threaded engagement 96a. The adapter element 96 extends downwardly and has a plurality of circumferentially spaced, internally threaded holes 96b for receiving threaded bolts 98. The threaded bolts 98 extend through apertures formed in the upper flange 28b of the valve 12 and provide a means for securely mounting the main housing 60 of the valve actuator 10 to the bonnet 28 of the valve 12.

The shaft 34 includes an upper portion 100 which is secured to a lower portion 102 by means of a threaded engagement 100a. A pair of perpendicularly disposed, radial locking pins 104 extend through apertures respectively provided in the upper and lower shaft portions to prevent relative rotative movement between the two portions. The lower shaft portion 102 is provided with an internally threaded bore hole 102a for receiving the external threaded portion 32a formed on the upper end of the valve stem 32. A locking washer 105 is located at the uppermost end of the stem 32 to securely lock the stem to the lower portion 102. A plurality of set screws 106 extend through the sidewall of the lower portion 102 and into the bore hole 102a to securely engage the stem 32.

A piston assembly 108 is mounted for axial movement within the cylindrical body 62 and defines an upper pressure chamber 110 and a lower pressure chamber 112. The piston assembly 108 includes a piston 114 which encompasses and is securely mounted to a support sleeve 116 by means of an internally threaded locking ring 118 which engages a cooperating externally threaded portion 116a on the sleeve 116. A set screw 120 is threaded into the locking ring 118 and is tightened to prevent loosening of the locking ring 118. The sleeve 116 has an upper end provided with an outer annular groove 116b and a lower end provided with an outer annular surface 116c which extends upwardly and inwardly to form an inclined surface 116d.

The piston assembly 108 has a lost motion connection to the shaft 34 to permit limited axial movement of the assembly 108 along the actuating shaft 34. The upper limit of this axial movement is defined by a stop ring 122 securely mounted on the upper portion 100 of the shaft 34 and having a lower shoulder 122a which engages an internal annular upper shoulder 116e formed in the upper end of the sleeve 116. The lower limit of the axial movement is defined by an upper surface 102b of the lower portion 102 which engages the extreme lower end 116f of the sleeve 116. Although not shown in the drawings, it may be desirous to provide a bearing surface between the stop ring 122 and the upper shoulder 116e and between the lower end 116f and the upper surface 102b in order to facilitate the concurrent rotational movement of the shaft 34.

A lower latching assembly 124 is mounted within the latch housing 64 and is utilized to maintain the actuating shaft 34 in its lowermost position. The latching assembly 124 includes an annular ratcheting element or collet 126, the sleeve portion of which is secured to the upper end of a cylindrical latching segment housing 128 by means of threaded fasteners 130. A helical compression spring 132 has a lower end engaging the lower end of the latch housing 64 and an upper end which engages a shoulder 129 on the latching segment housing 128 to bias the housing 128 and the collet 126 upwardly.

The latching segment housing 128 is adapted to receive a plurality of circumferentially spaced, radially movable latching segments 134 which are biased radially inwardly by means of a plurality of helical compression springs 136. The latching segments 134 are provided with a lower annular shoulder portion 134a which keeps shaft 34 from moving upward when biasing forces are applied through the valve stem 32. The shoulder portion 134a engages an upper annular shoulder 102c formed in the upper end of the lower portion 102 of the shaft 34 to maintain the shaft 34 in its lowermost position. The upper ends of the segments 134 are provided with inclined surfaces 134b which extend downwardly to inner annular portions 134c. A locking sleeve 138 is positioned within a reduced diameter portion of the latching segment housing 128 and is biased upwardly by means of a compression spring 140.

Figure 4:
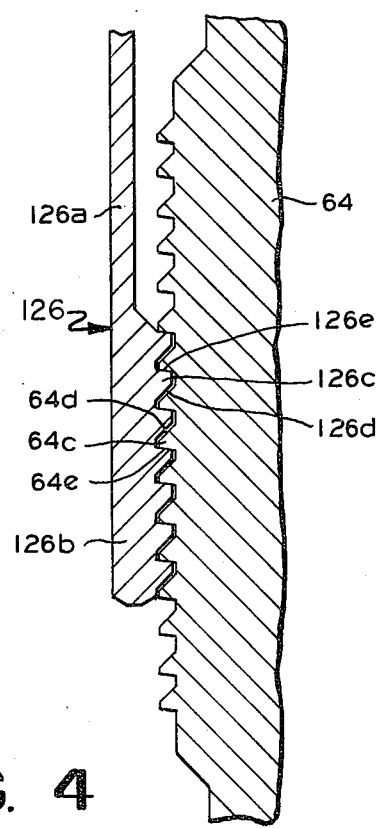
FIG. 4 is an enlarged sectional view illustrating the manner in which the latching assembly of FIG. 3 is coupled to the actuator housing.

In accordance with the present invention, the valve actuator 10 is provided with means for adjusting the axial position of the shoulder portion 134a of the latching assembly in order to control the lowermost latched position of the actuating shaft 34. Such means are shown in the enlarged sectional view of FIG. 4 which illustrates the manner in which the arms of the ratcheting element or collet 126 are coupled to the latch housing 64. The collet 126 includes a plurality of circumferentially spaced, downwardly extending, radially movable collet arms 126a having a lower end 126b formed with a series of external parallel annular ribs 126c which cooperate with internal parallel annular ribs 64c formed on the inner wall of the housing 64 for preventing upward movement of the collet 126 relative to the housing member 64. As shown in FIG. 4, the ribs 126c and 64c each have a cross-section similar to that of a buttress-type thread. The inclined surfaces 126d of the ribs 126c and the inclined surfaces 64d of the ribs grooves 64c permit selective downward movement of the collet arms 126a relative to the housing 64, while the generally horizontal surfaces 126e and 64e of the ribs 126c and 64c respectively prevent upward movement of the collet 126 relative to the housing 64. As will be discussed, in the event the ramp surface 32e at the lower end of the valve stem 32 has worn sufficiently such that the ball 20 is not wedged tightly against the sealing ring 24, the downward movement of the piston assembly 108 in moving the valve to the closed position causes the latching assembly to ratchet downwardly, thereby adjusting the downstop of the latching assembly and permitting the ball 20 to be tightly wedged against the sealing ring 24.

In FIG. 3, the valve actuator 10 is shown with the actuating shaft 34 in its lowermost position such that the ball valve 12 is closed. The shaft 34 is maintained in its lowermost position by the engagement of the upper annular shoulder 102c of the actuating shaft 34 with the shoulder portions 134a on the latching segments 134. When it is desired to open the ball valve, the actuating shaft 34 is moved to its upper position by applying fluid pressure through the line 16 into the lower pressure chamber 112 to the lower side of the piston 114 to urge the piston assembly 108 upwardly. As the assembly is moved upwardly, the inclined surface 116d at the lower end of the sleeve 116 engages the inclined surfaces 134b of the latching segments 134 and forces the segments radially outwardly to compress the springs 136. When the upper shoulder 116e of the sleeve 116 engages the stop ring 122 on the shaft 34, the shaft 34 will begin to move upwardly with the piston assembly 108.

As shown in FIG. 5, during the initial upward movement of the shaft 34, the outer annular surface 116c of the sleeve 116 will engage the inner annular portions 134d of the latching segments 134 and maintain the latching segments radially outwardly as the locking sleeve 138 follows the lower portion of the shaft 34 upwardly and into engagement with the lower shoulder 134a and surfaces 134e in the lower end of the segments 134. The locking sleeve 138 will continue to maintain the latching segments 134 in their outer position until the actuating shaft 34 is moved downwardly to move the sleeve 138 out of engagement with the segments 134.

The fluid pressure applied to the lower side of the piston assembly 108 will continue to move the actuating shaft 34 upwardly. As the shaft 34 is moved upwardly, it will also rotate as a result of the camming action between the pin 38 and the slot 32b and will move the ball 20 of the valve 12 to its open position. The upward movement of the piston assembly 108 will continue until the upper surface of the piston 114 engages the lower surface 84a of the head portion 84. When the piston assembly has moved to its uppermost position, as shown in FIG. 6, the latching pin 90 will be received within the annular groove 116b formed in the sleeve 116. If further upward movement of the piston assembly 108 and the shaft 34 is required, the head 84 can be adjusted accordingly.

The valve 12 can be returned to its closed position by relieving the fluid pressure in the lower chamber 112 and applying fluid pressure to the upper chamber 110 via the line 14 to urge the piston assembly 108 downwardly. As the piston assembly 108 moves downwardly, the lower end 116f of the sleeve 116 engages the upper surface 102b of the shaft 34 to force the shaft 34 downwardly. Concurrently, the shaft 34 will rotate 90° to move the ball to its closed position.

When the lower shoulder 102d engages the locking sleeve 138, the sleeve 138 will be forced downwardly as the spring 140 is compressed. When the sleeve 138 is moved out of engagement with the segments 134, the segments 134 will be forced radially inwardly by springs 136 to return to the latched positions as shown in FIG. 3. At this time, a downward force is exerted by the piston assembly 108 on the latching assembly 124 by the engagement of the locking ring 118 with the upper end of the collet 126. If this downward force is sufficient to overcome the combined upward force on the latch assembly 124 by the spring 132 and the actuating shaft 34, the latching assembly 124 will ratchet downwardly by momentarily moving the collet arms 126a radially inwardly and downwardly such that the ribs 126c will engage the next lower set of ribs 64c. Consequently, the lower shoulder portions 134a, which function as the latch for the actuating shaft 34, will be adjusted downwardly such that the ball 20 of the valve 12 will stay sufficiently wedged against the sealing ring 24, even upon loss of fluid pressure in chamber 110. The spring 132 ensures that sudden shocks on the latching assembly 124 do not cause the latching assembly 124 to ratchet downwardly any further than is necessary to produce a small clearance between members 134a and 102c.

Basically, the axial adjustment of the latching assembly 124 is performed in response to the wearing of the operative surfaces of the internal elements of the valve assembly. In the ball-type valve 12 of FIGS. 1 and 2, the major portion of the wear occurs on the ramp surface 32e, although other operative portions of the valve, such as the pin 40, the surface 20a, and the sealing ring 24, will also be subject to wear. As these operative surfaces wear, the latching assembly 124 is automatically adjusted downwardly by the actuating movement of the piston assembly 108 in order to compensate for the wear of the valve components.

Although the adjustable latching valve actuator of the present invention has been described with specific reference to a ball-type valve, it should be noted the valve actuator may also be utilized with other types of valve assemblies which require adjustment of the actuating position of an actuating shaft in order to compensate for internal wear of the elements of the valve assembly. It should also be noted that, in some instances, it may be desirious to utilize an alternative approach, such as a ball screw and ratchet arrangement, as the means for self adjusting the actuating position of the actuator.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A valve actuator for actuation of a valve assembly, said actuator comprising: a housing; an actuating shaft supported for axial movement relative to said housing; means for moving said shaft axially in one direction to an actuated position; a latch member; means on said actuating shaft for engaging said latch member at said actuated position; and means for mounting said latch member for selective axial movement relative to said housing; said mounting means being responsive to said shaft moving means for moving said latch member axially relative to said housing in said one direction, upon a change in said actuated position.

2. A valve actuator according to claim 1 wherein said mounting means includes a ratcheting means to permit selective axial movement of said latch member in the one direction and prevent axial movement of said latch member in an opposite direction.

3. A valve actuator according to claim 1 wherein said mounting means includes a collet element for supporting said latch member, said collet element having at least one radially movable axially extending arm provided with a detent means, said housing having a series of axially extending teeth engageable by said detent means to permit said collet and said latch member to be ratcheted axially in said one direction.

4. A valve actuator according to claim 1, wherein said mounting means includes a collet element for supporting said latch member, said collet element having at least one radially movable arm provided with a first series of parallel annular ribs for engagement with a cooperating second series of parallel annular ribs formed on said housing, each of said first ribs provided with an inclined surface which engages a cooperating inclined surface of a respective one of said second ribs to permit said collet and said latch member to be ratcheted axially in the one direction, each of said first ribs also provided with a flat surface generally perpendicular to the axis of said actuating shaft which engages a cooperating flat surface of a respective one of said second ribs for preventing axial movement of said collet element and said latch member in the opposite direction.

5. A valve actuator according to claim 3 or 4 including means for biasing said collet element axially in the said opposite direction.

6. A valve actuator according to claim 1 wherein said shaft moving means is a piston assembly coupled to said actuating shaft and supported for axial movement within said housing, said piston assembly being responsive to a fluid pressure source for moving said shaft axially in the one direction.

7. In combination with a valve assembly including a main body having a ball centrally located therein for controlling fluid flow through a central passageway, an annular ball seat surrounding said central passageway and adapted to sealingly engage said ball, a valve stem having one end coupled to said ball for controlling the operation of the valve, said ball being movable to a closed position in response to axial movement of said valve stem in one direction, a valve actuator for actuation of said valve assembly, said actuator comprising: a housing secured to said main body of said valve assembly, an actuating shaft connected to the other end of said valve stem and supported for axial movement relative to said housing; means for moving said shaft axially in one direction to an actuated position to close said valve; a latch member; means on said actuating shaft for engaging said latch member at said actuated position; and means for mounting said latch member for selective axial movement relative to said housing, said mounting means being responsive to said shaft moving means for moving said latch member axially relative to said housing in said one direction, upon a change in said actuated position.

8. A combination according to claim 7 wherein said mounting means of said valve actuator includes a ratcheting means to permit selective axial movement of said latch member in the one direction and prevent axial movement of said latch member in an opposite direction.

9. A combination according to claim 7 wherein said mounting means of said valve actuator includes a collet element for supporting said latch member, said collet element having at least one radially movable, axially extending arm provided with a detent means, said housing having a series of axially extending teeth engageable by said detent means to permit said collet and said latch member to be ratcheted axially in said one direction.

10. A combination according to claim 7 wherein said mounting means of said valve actuator includes a collet element for supporting said latch member, said collet element having at least one radially movable arm provided with a first series of parallel annular ribs for engagement with a cooperating second series of parallel annular ribs formed on said housing, each of said first ribs provided with an inclined surface which engages a cooperating inclined surface of a respective one of said second ribs to permit said collet and said latch member to be ratcheted axially in the one direction, each of said first ribs also provided with a flat surface generally perpendicular to the axis of said actuating shaft which engages a cooperating flat surface of a respective one of said second ribs for preventing axial movement of said collet element and said latch member in the opposite direction.

11. A combination according to claims 9 or 10 wherein in said valve actuator includes means for biasing said collet element axially in the opposite direction.

12. A combination according to claim 7 wherein said shaft moving means of said valve actuator is a piston assembly coupled to said actuating shaft and supported for axial movement within said housing, said piston assembly being responsive to a fluid pressure source for moving said shaft axially in the one direction.

13. In combination with a valve assembly including a main body having a ball centrally located therein for controlling fluid flow through a central passageway, an annular ball seat surrounding said central passageway and adapted to sealingly engage said ball, a valve stem having an operative surface at one end thereof coupled to said ball for controlling the operation of the valve, said ball being movable to a closed position in response to axial movement of said valve stem in one direction, a valve actuator for actuation of said valve assembly, said actuator comprising: a housing secured to said main body of said valve assembly; an actuating shaft connected to the other end of said valve stem and supported for axial movement relative to said housing; means for moving said shaft axially in one direction to an actuated position to close said valve; a latch member; means on said actuating shaft for engaging said latch member at the said actuated position; and means for mounting said latch member for selective axial movement relative to said housing, said mounting means being responsive to wearing of the operative surfaces of said valve stem for moving said latch member axially relative to said housing in said one direction, upon a change in said actuated position.

14. A combination according to claim 13 wherein said valve stem of said valve assembly includes a ramp surface provided on the one end of said valve stem for engaging said ball to wedge said ball against said annular ball seat, and said mounting means of said valve actuator is responsive to wearing of said ramp surface for moving said latch member.

15. A combination according to claim 13 wherein said mounting means of said valve actuator includes a ratcheting means to permit selective axial movement of said latch member in the one direction and prevent axial movement of said latch member in an opposite direction.

16. A combination according to claim 13 wherein said mounting means of said valve actuator includes a collet element for supporting said latch member, said collet element having at least one radially movable, axially extending arm provided with detent means, said housing having a series of axially extending teeth engageable by said detent means to permit said collet and said latch member to be ratcheted axially in said one direction.

17. A combination according to claim 13 wherein said mounting means of said valve actuator includes a collet element for supporting said latch member, said collet element having at least one radially movable arm provided with a first series of parallel annular ribs for engagement with a cooperating second series of parallel annular ribs formed on said housing, each of said first ribs provided with an inclined surface which engages a cooperating inclined surface of a respective one of said second ribs to permit said collet and said latch member to be ratcheted axially in the one direction, each of said first ribs also provided with a flat surface generally perpendicular to the axis of said actuating shaft which engages a cooperating flat surface of a respective one of said second ribs for preventing axial movement of said collet element and said latch member in the opposite direction.

18. A combination according to claims 16 or 17 wherein said valve actuator includes means for biasing said collet element axially in the said opposite direction.

19. A combination according to claim 13 wherein said shaft moving means of said valve actuator is a piston assembly coupled to said actuating shaft and supported for axial movement within said housing, said piston assembly being responsive to a fluid pressure source for moving said shaft axially in the one direction.

20. A method of successively rotating a ball valve into wedging engagement with a fixed annular seat, the ball valve being co-rotatably secured to an axially shiftable actuator, comprising:
- (a) moving the actuator axially relative to the ball valve and concurrently rotating the actuator to rotate the ball valve to its closed position;
- (b) engaging a cam surface on the actuator with the ball during the final axial movement of the actuator to wedge the ball toward its annular seat;
- (c) engaging the actuator with a latch in its valve closed axial position; and
- (d) automatically shifting the latch axially to accommodate for wear of the operative surfaces of the ball valve, seat and actuator.

21. A valve actuator for actuation of a valve assembly, said actuator comprising: a housing; an actuating shaft supported for axial movement relative to said housing; means for moving said shaft axially in one direction to an actuated position; a latch member; means on said actuating shaft for engaging said latch member at said actuated position at the end of each actuating stroke; and means for mounting said latch member for selective axial movement relative to said housing; said mounting means being responsive to said shaft moving means for moving said latch member axially relative to said housing in said one direction, upon a change in said actuated position.

22. A method of operating a shiftable valve member into wedging engagement with a fixed valve seat by a linearly shiftable actuator, comprising:
- (a) moving the actuator linearly to shift the valve member to its closed position in engagement with the valve seat;
- (b) engaging a cam surface on the actuator with the valve member during the final linear movement of the actuator to wedge the valve member toward its seat;
- (c) engaging the actuator with a latch in its valve closed position; and
- (d) automatically shifting the latch to accommodate for wear of the operative surfaces of the valve member, valve seat and actuator.

* * * * *